July 10, 1928.  1,677,091
J. H. HOMRIGHOUS
IMPULSE TRANSMITTING DEVICE
Original Filed Sept. 13, 1918   5 Sheets-Sheet 1

Inventor:
John H. Homrighous.
Atty.

Patented July 10, 1928.

1,677,091

UNITED STATES PATENT OFFICE.

JOHN H. HOMRIGHOUS, OF OAK PARK, ILLINOIS, ASSIGNOR, BY MESNE ASSIGNMENTS, TO AUTOMATIC ELECTRIC INC., OF CHICAGO, ILLINOIS, A CORPORATION OF DELAWARE.

IMPULSE-TRANSMITTING DEVICE.

Application filed September 13, 1918, Serial No. 253,860. Renewed February 24, 1925.

My invention relates to improvements in impulse transmitting devices, and it relates particularly to an operator's impulse transmitting device for use in connection with automatic or semi-automatic systems, in which a plurality of groups of impulses are transmitted over a line circuit for the purpose of operating automatic selecting switches.

Among the objects of my invention are to provide an improved construction of such a calling device, and to provide a simplified structure using a single set of keys for calling any number having a plurality of digits. Also when any key is operated, the apparatus is automatically set in motion to transmit the impulses corresponding to the digit of the key operated with a view of reducing the time required to complete a connection.

A further object is to provide a signal at the operator's position to notify her when the calling device has operated to transmit the desired number of series of impulses corresponding to the actual number of keys operated, that is, one or more keys may be operated in quick succession, or as fast as the operator is able to work, and when the last series of impulses corresponding to the digit of the last key operated are transmitted, a signal will notify the operator that the desired number has been completely transmitted.

A further object is to provide an improved means for separating the different series of impulses representing the different digits of any called number, which means involves the use of a rotary switch which is operated by an operator, a number of steps corresponding to a digit of the called number, and which interrupter at the same time causes a stepping relay to repeat the impulses over the extended line circuit to operate an automatic switch. The rotary switch is then released to normal position in readiness to start rotating again upon the de-energization of a slow relay, which is timed to give the correct space between successive series of impulses.

Further objects of my invention will be more readily understood by referring to the accompanying drawings, in which I have illustrated one embodiment of my invention.

In the drawings Figures 1 to 7 inclusive, represent the mechanical construction and circuits of the apparatus embodying the principles of my invention. Figure 6 shows diagrammatically the circuits of the calling device.

Figure 1:
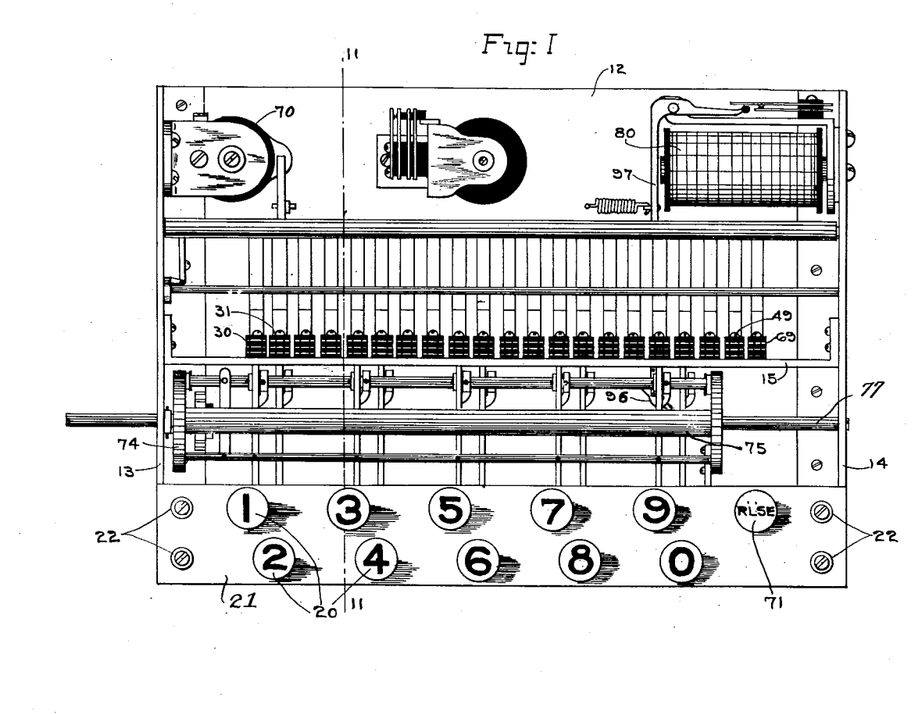
Figure 1 shows a plan view of my improved operator's calling mechanism.
Figure 2:
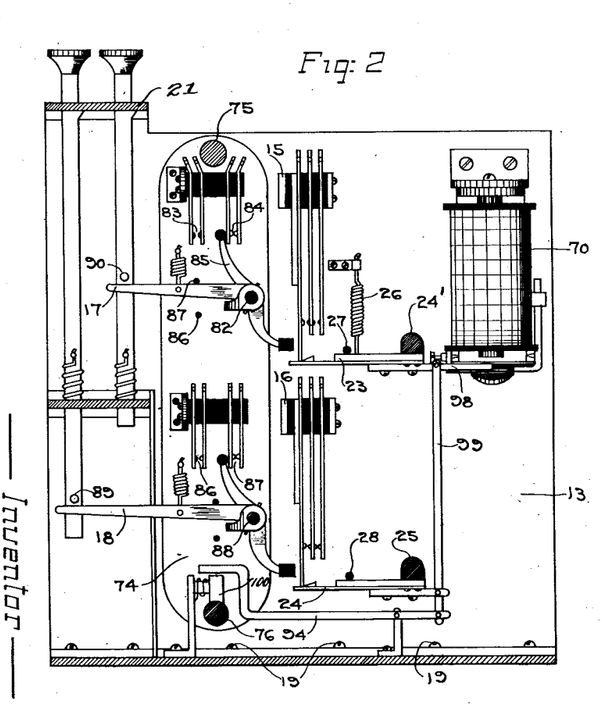
Figure 2 is a sectional view as seen from the right on the line 11—11 of Figure 1.

I shall first describe the construction and method of operation of the operator's calling device, which is illustrated in Figures 1 to 5 inclusive. In these figures 15 and 16 represent suitable spring mounting pieces secured to the end plates 13 and 14, by screws in such a manner that the springs mounted thereon may be actuated by the arms associated with the keys or push buttons 20, such as arms 17 and 18 associated with the buttons corresponding to the digits 1 and 2 respectively. The plates 13 and 14 have their lower end and upper end bent at right angles and secured to the base plate 12 and key plate 21, respectively, by screws 19 and 22 respectively. The sets of springs 30, 31, 32, etc., are held in their operated position, when actuated by the arms associated with the keys, by a detent such as shown on spring 23 (Fig. 2), which is secured to the shaft 24' there being a spring similar to spring 23 for each set of springs 30, 31, etc., as shown in Figure 2. Likewise the springs 50, 51, 52, etc., are held in their operated position when actuated, by a detent such as shown on spring 24 which is secured to the shaft 25, there being a spring similar to spring 24 for each set of springs 50, 51, etc. The shafts 24' and 25 have suitable bearings in the end plates 13 and 14, and are held in normal position with the springs 23 and 24 against the stops 27 and 28 respectively, as shown in Figure 2, by tension in spring 26 and by the connecting member 99. The shafts 24' and 25 are rotated in a counter-clock-wise direction upon the energization of the release magnet 70, through the medium of its armature and the horizontal arm 98, thereby restoring all the springs 30, 31, 50 and 51 etc. to normal position.

Figure 3:
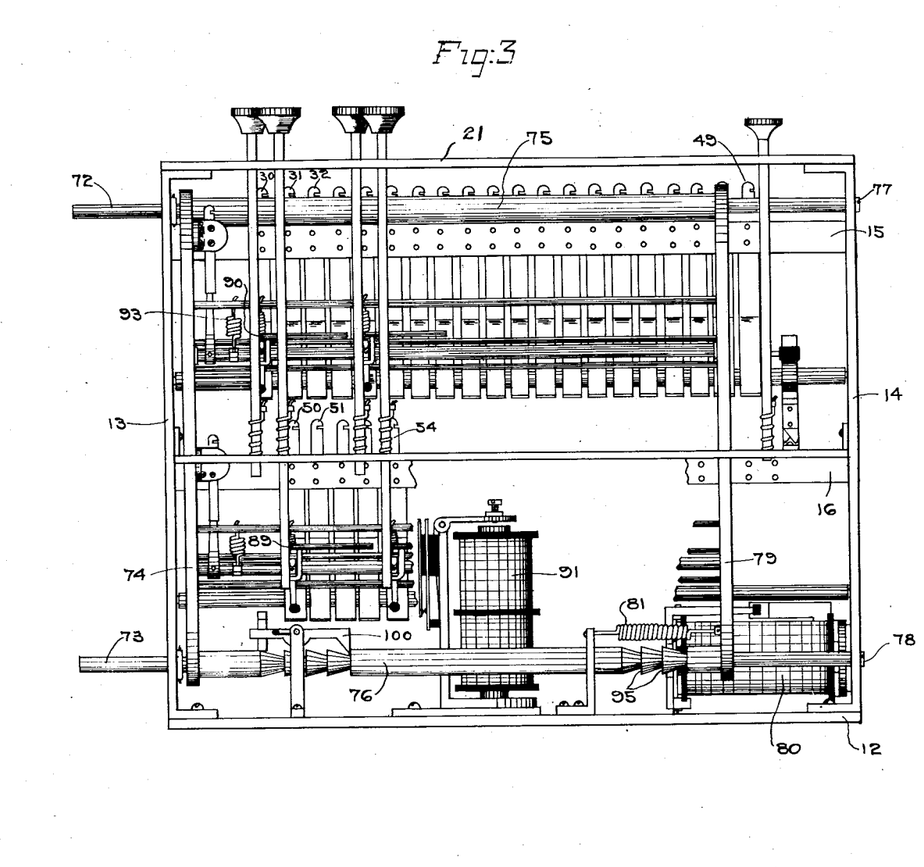
Figure 3 is a sectional view, as seen from the front, with certain parts omitted for clearness in illustration.
Figure 4:
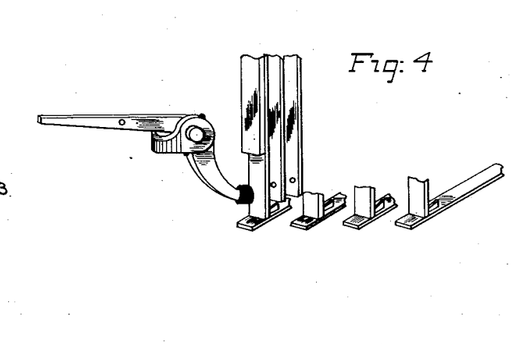
Figure 4 is a perspective view of a controlling arm and the different springs adapted to be operated by one key.
Figure 5:
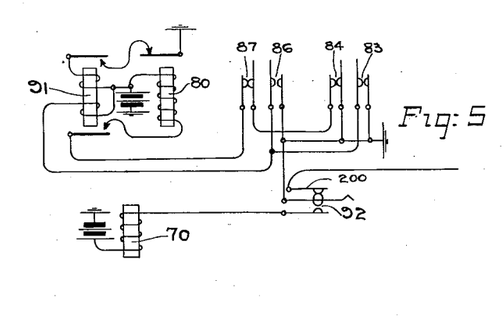
Figure 5 shows diagrammatically the circuits for the stepping magnet 80 and release magnet 70.

The shafts 72 and 73 are screwed into the horizontal members 75 and 76 and hold the vertical plate 74 securely against a shoulder on the horizontal members, reference being had to Figures 1 and 3. Likewise the shafts 77 and 78 are screwed into the horizontal members 75 and 76 respectively, at the opposite end, and hold the vertical member 79 against a shoulder on the horizontal members. The shafts 72, 73, 77 and 78 are mounted in suitable bearings in the end plates 13 and 14, and are moved toward the right (in Figs. 1 and 3) by the stepping magnet 80, through the medium of its armature 97 and the pawl 96, engaging the notches 95 on the member 76. The retaining pawl 100 holds the member 76 together with its associated parts in its operated position. The member 76 is restored to normal position by the spring 81 at the same time that the springs 30, 31, etc., are restored to normal, by the lever 94 disengaging the retaining pawl 100 from the notches in member 76, as shown in Figure 2. The controlling arm 17 and a similar arm for each of the keys corresponding to the digits 1, 3, 5, etc., are loosely mounted on a shaft 82, which shaft has suitable bearings in the vertical members 74 and 79. Associated with each controlling arm is a cam which has a projection extending under the arm (Figure 4) and securely fastened to the shaft 82, so that on the downward motion of any arm, the shaft 82 is rotated in a counter-clockwise direction, to close the springs 83 and open the springs 84, through the medium of the arm 85, which is also securely fastened to one end of the shaft 82, for a purpose to be hereinafter described. Each controlling arm is returned to normal by an individual spring, as shown in Figure 2, also the shaft 82 is rotated back to normal position by the spring 93 (Fig. 3). Likewise the controlling arm 18 and a similar arm for each of the keys corresponding to the digits 2, 4, 6, etc., is similar to the arm 17, except that it has a somewhat longer horizontal member, so that they may be operated by the said keys. The springs 86 and 87 are operated in the same manner, as the springs 83 and 84 by the shaft 88.

The method of operation of the mechanism is as follows: When any key or push button 20 is operated, the associated controlling arm such as 17 or 18 is moved in an downward direction by a relatively long horizontal member secured to the key, as shown in Figures 2 and 3 by arms 89 or 90, so that the set of springs in front of the arm associated with the key pressed, is operated and held in an operated position by the detent, as hereinbefore described and by closing springs 83 or 86, depending upon what key was pressed, a circuit is closed for the double wound relay 91, referring to Figure 5. Suppose the key corresponding to the digit 3 to be operated then the arm 85 allows the springs 84 to open and closes spring 83, which in turn completes a circuit for the lower winding of relay 91; relay 91 upon energizing, closes a holding circuit for itself and prepares a circuit for the stepping magnet 80. When the arm 85 returns to normal, the springs 84 are again closed completing a circuit for the stepping magnet, which in turn upon energizing through the medium of its armature 97 and the member 76 moves all the controlling arms to a position where they are before the next set of springs. Likewise the next key depressed causes all the arms to be moved to a position where each arm is standing before the third set of springs of which it is adapted to operate. Therefore it should be understood that each key may operate any one of four sets of springs such as 30, 31, 32 and 33, which springs place ground potential upon the contacts in the bank of a rotary switch corresponding to the digits of the key operated, all of which will be more fully described hereinafter.

Also it should be understood that the carriage which carries all of the arms 17, 18, etc. is normally in such a position that any key, when operated, will, by means of its associated arm such as 17, operate only its first set of contact springs such as 30, 34 or 50, depending upon the key pressed; and that the common springs 83 and 84 are operated each time any key is pressed to move all the controlling arms 17 etc., to such a position that the next key pressed will operate only the second set of springs associated with the key pressed, namely, 31, 35, 51 etc. Thus, the first key pressed puts ground on some contact in the upper bank or level of the switch E only, while, the second key pressed puts ground on some contact of the second level of the said bank.

Referring to Figure 6, E represents a rotary switch, the mechanism of which may be of any well known type of rotary switch, and comprises the usual stepping relay 105, which responds to impulses from the common interrupter I, which causes the rotary magnet 108 to step the wipers 110, 111, 112 and 113 over the contacts in its bank and at the same time repeats the impulses over the extended line circuit at springs 114. Upon the first operation of any button of the calling device, the first set of springs controlled by the key corresponding to that digit is operated and held in an operated position by the detent, as hereinbefore described, and will place a ground potential upon a contact in the first level of contacts in the bank to which the rotary switch E has access. Likewise the next operation of the same button or any other button will place a ground potential upon a contact in the second level of contacts in the bank which the switch E has access to. Suppose that the third key to be operated is five, then the fifth contact in the third level will have a ground potential applied to it. The springs 30, 31, 32 and 33 correspond to thousands, hundreds, tens and units respectively, of the No. 1111. The springs 34, 35, 36 and 37 correspond to the digit 3. The lamp L³ is for signalling the operator when the desired connection is completed, all of which will be more fully hereinafter described.

Figure 7:
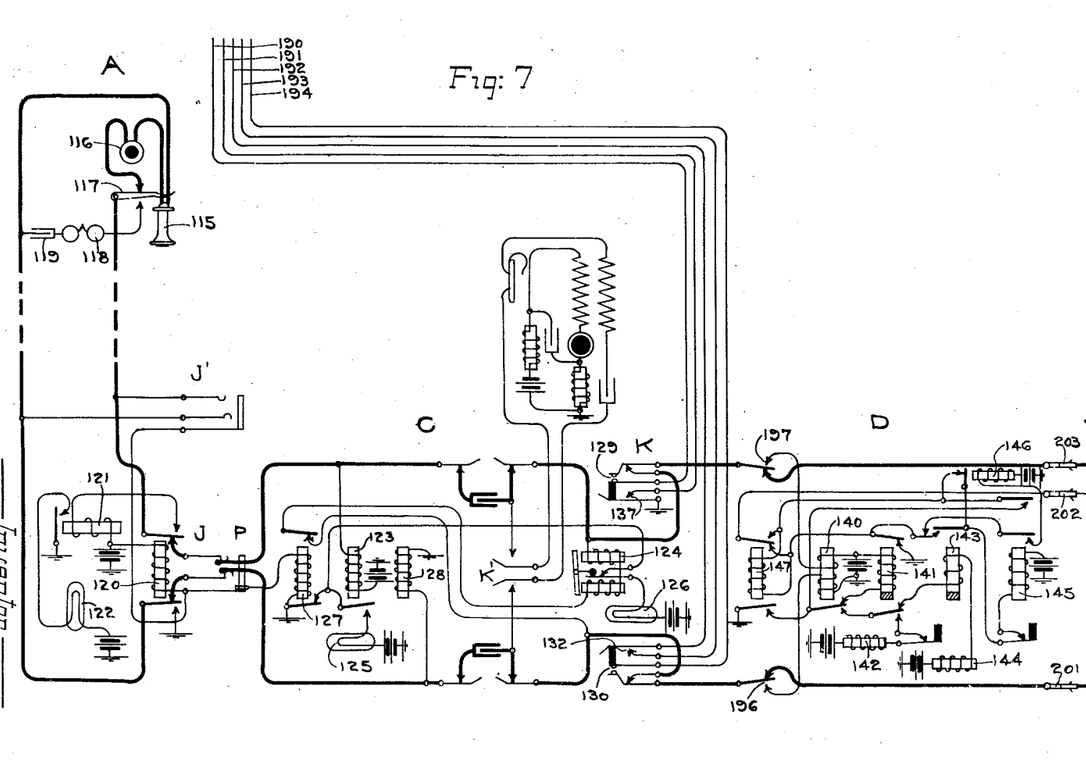
Figure 7 shows a circuit connection extending from the manual substation A through the operator's cord C, to the selector switch D.
Figure 8:
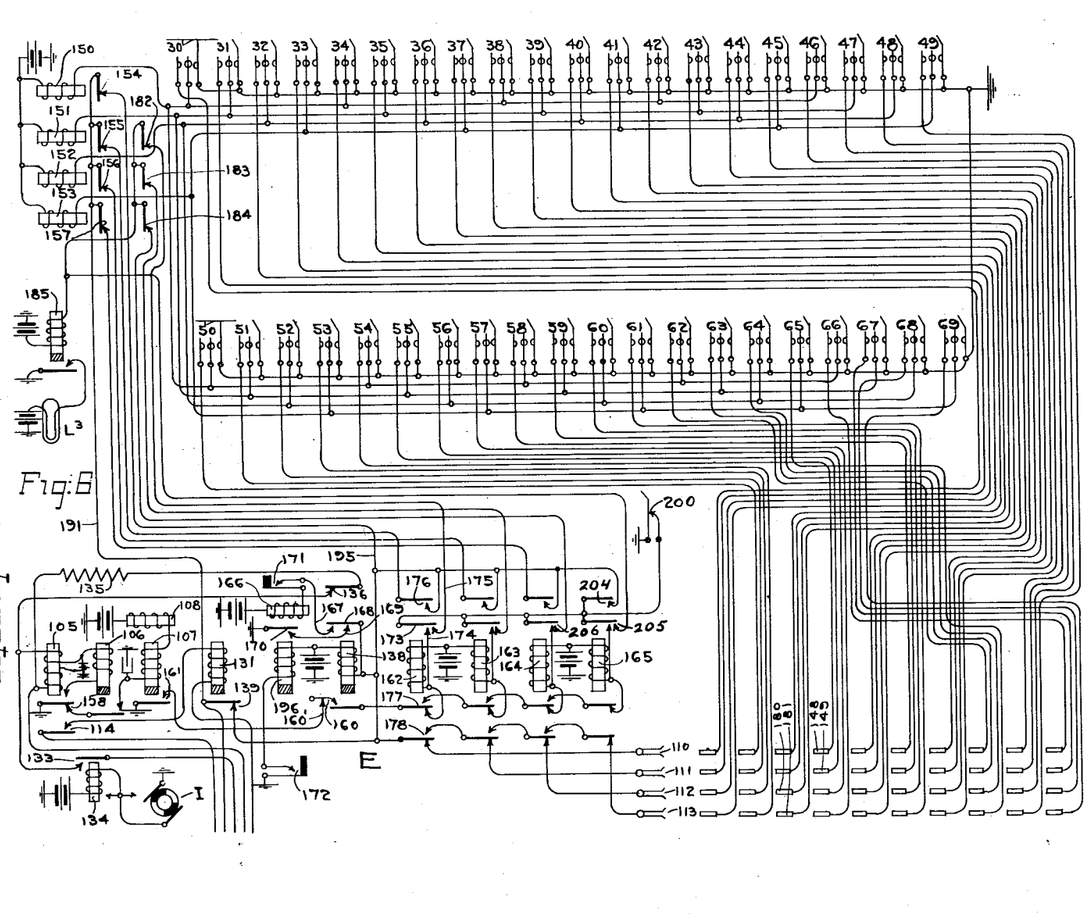

Referring to Figure 7. The manual substation A may be of any suitable type, but as herein illustrated, comprises the usual receiver 115, transmitter 116, switch-hook 117, ringer 118 and condenser 119. At the central office, there is allotted to the line of substation A, jacks J and J', a cut off relay 120, line relay 121, and line lamp 122.

The operator's cord C may be any suitable type of cord circuit; as herein represented, the cord C is connected direct to the automatic switch D and comprises an answering plug P, supervisory relays 123 and 124, and the supervisory lamps 125 and 126. It is also provided with the usual listening key K', and a calling device key K, by means of which a calling device similar to that shown in Figures 1 to 6 inclusive, may be connected with the cord.

The selector switch D may be of the general type of selector switch disclosed in U. S. Letters Patent No. 815,321, granted March 13, 1906, to Keith, Erickson & Erickson, being, however, more nearly of the particular type disclosed in British patent to Automatic Telephone Manufacturing Co., No. 2.543 of 1914.

Having given a general description of the apparatus involved in the system. I will now proceed to explain more in detail, the operation of the same.

When the receiver at substation A is removed, a circuit for the line relay 121 is completed in the usual well known manner. Relay 121 upon energizing, closes a circuit through the line lamp 122. The operator thereupon inserts the plug P into the jack J, whereby a circuit is closed for cut-off relay 120 and sleeve relay 127 in series. The relay 120 upon energizing, disconnects ground and the line relay 121 from the line circuit and closes the line circuit through to the cord C. Relay 127 upon energizing, closes a point in the circuit of supervisory lamps 125 and 126; also closes a point in the circuit of supervisory relay 124. Battery to the substation A for talking purposes, is supplied through the windings of relays 123 and 128. The operation of key K disconnects the cord C from the trunk line leading to the selector switch D and extends the trunk line at springs 129 and 130 to the rotary switch E over the impulse circuit, which includes the low resistance relay 131 and springs 114 in series. Springs 137 at key K are adjusted to make before springs 132, so that a circuit for the controlling relay 138 of the switch E is completed before the circuit for the stepping relay 105, through the springs 133, is completed, so that the rotary switch E will not start to rotate before a push button has been operated. The closure of springs 137, places ground on the common conductor 191 through springs 154 to conductor 195, through relay 138 to battery. A branch of the above circuit extends by way of springs 139 to the conductor 195. Relay 138 upon energizing, closes a holding circuit for relay 105 to maintain the same energized, including the resistance 135 at springs 136, for a purpose to be hereinafter described. At springs 132, key K, a circuit for the stepping relay 105 is completed over common conductors 192 and 193, through the springs 133 of the interrupter relay 134. Relay 105 upon energizing, closes a circuit for slow relay 106, and at springs 114 closes a circuit for the line relay 140 of the selector switch D as follows: ground lower winding of relay 140, springs 196 and 130 common conductor 194, winding of relay 131, springs 114 common conductor 190, springs 129 and 197 upper winding of relay 140 to battery. Relay 140 upon energizing, closes a circuit for slow release relay 141. Relay 141 upon energizing, opens a point in the circuit of release magnet 142 and prepares a circuit for relay 143 and the vertical magnet 144 in series. The operator may now operate the keys or push buttons according to the digits in the called number. We will assume that a desired subscriber's number is 4433. Therefore the operator will press the #4 button two times and the #3 button two times, which will operate springs 54, 55, 36 and 37 (Figure 6). The operation of springs 54 places ground potential upon the fourth contact 148 in the upper level of contacts in the bank, to which the rotary switch E has access, and at the same time closes the circuit for relay 150. Relay 150 upon energizing, opens the holding circuit for relay 138 at springs 154. Relay 138 upon de-energizing, opens the holding circuit for relay 105 at springs 136. The stepping relay 105 will now be alternately de-energized and energized by the opening and closing of springs 133 and at springs 158 will open and close the circuit of relay 107 and the rotary magnet 108 to step the wipers 110, 111, 112 and 113 over the contacts in the bank of switch E, until the wiper 110 finds ground potential at contact 148, which again closes a circuit for the controlling relay 138. Relay 107 upon energizing, prepares a circuit for relay 162, at springs 161. At the first rotary step of switch E, a circuit is closed for slow relay 196 at the off normal springs 172, relay 196, upon energizing, preparing a holding circuit for relay 138 at springs 170. Relay 138 upon energizing from ground potential at contact 148, closes the holding circuit for the stepping relay 105, at springs 136. Relay 105 will now remain energized to stop the rotation of switch E and hold the line circuit closed at springs 114. A holding circuit for relay 138 is closed at its springs 168 and 169, and at springs 167 and 168 the circuit for release magnet 166 is closed. The release magnet 166 upon energizing restores the shaft (not shown) and wipers 110, 111, etc., to normal position in the usual well known manner; also at springs 160 and 160', a circuit for relay 162 is closed momentarily. Relay 162 upon energizing, closes a holding circuit for itself at springs 173 and 174 to ground through spring 200, controlled by the release button; also at springs 176 closes a point in a holding circuit for relay 138, prepares a circuit for relay 163 at springs 177 and at springs 178 connects the wiper 111 to the controlling or test relay 138. The spring 173 of relay 162 and the similar springs of relays 163, 164 and 165, are adjusted to make contact before the other springs controlled by the relays start to move. Also the spring 160' of relay 138 is adjusted to follow up and just break contact when the armature of relay 138 is fully attracted.

At the same time that the stepping relay 105 was operating the rotary magnet 108 of the rotary switch E to step the wipers 110, 111, etc., to the fourth contact, the springs 114 opened and closed the circuit of line relay 140 of the selector switch D, hereinbefore traced, to in turn operate the vertical magnet 144 to step the wipers 201, 202 and 203 to the fourth level of contacts in the bank to which the selector switch D has access. The selector switch D will then automatically rotate through the medium of interrupter relay 145 and rotary magnet 146 to seize the first idle trunk line in the fourth level in the usual and well known manner, which extends the line circuit to another selector switch (not shown) similar to switch D.

Suppose the operator pressed the keys corresponding to the called number 4433 in rapid succession, then the operation of springs 55 (Figure 6) by the second operation of key number 4 places ground potential on the fourth contact 149 in the second level of the bank, to which E has access, and closes a circuit for relay 151. Relay 151 upon energizing, opens a point in the holding circuit of relay 138 at springs 155 and at springs 182 opens a point in the circuit of slow relay 185. Likewise the operation of springs 36 and 37 by the first and second operations of key number 3 places ground potential on the third contacts 180 and 181 in the third and fourth levels of the bank, and closes the circuits for relays 152 and 153. The switch E being released to normal position after the first series of impulses have been transmitted, will open the circuit of release magnet 166 at off normal springs 171 and at springs 172 opens the circuit of relay 196. Relay 196 upon de-energizing, opens the holding circuit for relay 138. Relay 138 will now de-energize and open the holding circuit for the stepping relay 105 at springs 136. The time that it takes the switch E to release and start rotating again after a series of impulses are delivered, is controlled by the de-energization of relay 138, to give the proper pause between the different series of impulses, and it is adjusted to take practically the same time as required for the slow series relay of an automatic trunking switch to deenergize and the switch to rotate over all the contacts in any one level, such as relay 143 of switch D.

The rotary switch will now operate in the manner described to transmit the remaining series of impulses over the line circuit. When the last series of impulses is delivered, relay 165 is energized and closes a circuit for relay 185 at springs 205. Relay 185 upon energizing, closes a circuit through lamp L³ to notify the operator that the desired connection is completed and at springs 204 relay 165 closes a holding circuit for relay 138, through spring 200 controlled by the release button.

It will be seen that should the operator press only the first key of the digit, and then wait before pressing the next key, until the impulses of this first series have been completed, that the lamp L³ will be lighted as soon as relay 162 is energized. This of course, will be understood by the operator to mean that the digit which she has sent has been completed and as soon as the next key is pressed the lamp will again be extinguished.

The operator, upon noticing the lamp L³ glowing after all the keys have been operated, will press the release button as shown in Figs. 1 and 6 which restores the key mechanism to normal position by releasing the latch 100 shown in Fig. 2 to allow the carriage which carries the arms 17, 18 etc., to release to normal, as hereinbefore described and at the same time opens the holding circuit for relays 162, 163, 164 and 165, by opening the ground circuit at springs 200 shown in Fig. 6, thereby restoring the switch E to normal position, which may now be used to set up another connection. After pressing the release button, the operator will restore the key K to the position shown in the drawing, which disconnects the calling device from the trunk line, whereby the calling and called substation are united over the heavy conductors shown in the drawings.

Suppose the called number to consist of only three digits, then when the last series of impulses is delivered, a circuit for relay 185 is completed from ground through springs 200, and springs 206 of relay 164, through springs 184, winding of relay 185 to battery. Relay 185 upon energizing, closes a circuit through the lamp L³ to notify the operator that the number set up has been transmitted desired connection is completed.

While I have explained my invention to show a certain specific embodiment thereof, I do not wish to limit myself to the precise forms shown, but I desire on the contrary, to include and have protected by Letters Patent, all forms and modifications thereof, which may come within the scope of the appended claims.

What I claim as my invention is:

1. In a telephone system, a line, a device for transmitting impulses over said line consisting of a switch with a wiper having rotary motion, a set of keys, means controlled by any of said keys for starting the rotation of said switch to move said wiper and for predetermining the extent of movement thereof irrespective of an immediate subsequent operation of any other of the keys, and means controlled in the movement of said wiper for transmitting impulses.

2. In a telephone system, a line, a device for transmitting impulses over said line, consisting of a switch with a wiper having rotary motion, a set of keys, means controlled by any of said keys for starting the rotation of said switch to move said wiper and for predetermining the extent of movement thereof independent of the immediate operation of any other key, and means controlled in the movement of said wiper for transmitting impulses, said impulses varying in number according to the key first pressed.

3. In a telephone system, an automatic switch, a plurality of wipers for said switch, a set of contacts accessible to each wiper, a set of controlling keys, means controlled by the initial operation of any key for causing said switch to rotate, and for placing a potential on a contact accessible to one wiper, means controlled by said potential for releasing the switch when said wiper reaches said contact, means controlled by the second operation of said key for placing a potential on a contact accessible to a second wiper and for again causing said switch to rotate thereto, and means controlled in the operation of said switch for transmitting impulses corresponding to the digits of a called number.

4. In a calling device, an impulse sender, a key for controlling the operation thereof, a plurality of sets of contacts controlled successively by said key, said impulse sender controlled by the first operation of the key through the medium of one set of contacts and by further operations of the key through the medium of succeeding sets of contacts to transmit impulses corresponding to the digits of a called number.

5. In a calling device, a rotary switch for transmitting impulses, a set of keys for controlling the operation thereof, a plurality of wipers for said switch, means controlled over one wiper for controlling said switch to send impulses for the first digit of a called number, said means controlled successively over the other wipers of the switch to cause said switch to transmit impulses representing succeeding digits of the called number.

6. In a telephone system, an operator's position, an impulse transmitter for said operator adapted to transmit impulses of called numbers having a varying number of digits, a signal for said operator, means controlled upon the transmission of the final impulse of a called number by said transmitter for operating said signal regardless of the number of digits in the called number.

7. In a telephone system, an operator's position, an impulse transmitter for said operator adapted to transmit impulses of called numbers having a varying number of digits, a signal for said operator, means controlled upon the completion of the transmission of impulses by said transmitter for operating said signal regardless of the number of digits in the called number.

8. In an impulse transmitting device, comprising a rotary switch adapted to be operated in accordance with the digits of the called number, a plurality of operating keys, test wipers for said switch and contacts accessible thereto, means for applying a ground potential to a plurality of the contacts according to the keys operated when the keys are depressed and for initiating the operation of said switch; a relay for stopping the rotation of said switch, a winding for said relay, means for energizing said winding when one of said wipers engages one of said grounded contacts, whereby said switch is stopped between the series of impulses representing the digits of the called number.

9. In an impulse transmitting device, comprising a rotary switch adapted to be operated in accordance with the digits of the called number, a plurality of operating keys, test wipers for said switch and contacts accessible thereto, means for applying a ground potential to a plurality of the contacts of said switch according to the keys operated when the keys are depressed and for initiating the operation of said switch; a relay for stopping the rotation of said switch, a winding for said relay, means for energizing said winding when one of said wipers engages one of said grounded contacts, whereby said switch is stopped and released to normal position.

10. In an impulse transmitting device, comprising a rotary switch adapted to be operated in accordance with the digits of the called number, a plurality of operating keys, test wipers for said switch and contacts accessible thereto, means for applying a ground potential to the contacts according to the keys operated and for initiating the operation of said switch when the first of said keys is operated; a relay for stopping the rotation of said switch, a winding for said relay, means for energizing said winding when one of said wipers engages one of said grounded contacts, whereby said switch is stopped and returned to normal position, after a series of impulses representing a digit in the called number have been transmitted and the switch automatically rotated again in accordance with the next digit of the called number, upon the de-energization of said relay.

11. In a telephone system, a calling device comprising a single set of operating keys any one of which may be used for any digit of a called number, sets of contacts, controlled thereby, a switch adapted to be operated by the engagement of said contacts and means controlled by said switch for transmitting impulses according to all the digits of the called number following a plurality of operations of any key.

12. In a telephone system, a calling device comprising a plurality of operating keys, a plurality of sets of self-locking contacts, operated by each key, a switch adapted to be operated by the engagement of said contacts, means controlled by said switch for transmitting impulses according to the digits of the called number; and a relay for controlling the operation of said switch, whereby said switch is released to normal position between the series of impulses representing the various digits of the called number.

13. In a telephone system, a calling device comprising a single set of operating keys, a plurality of sets of contacts controlled by each of said keys, a switch adapted to be started by closing a contact in one of said sets, and means controlled by said switch responsive to the closure of said contact and subsequently closed contacts in the same or other sets for transmitting impulses according to all of the digits of the called number.

14. In a telephone system an impulse transmitting device, consisting of a pair of contact springs, a relay for intermittently operating said springs, an interrupter for controlling said relay, controlling means consisting of a rotary switch having a controlling relay and a plurality of wipers cooperating therewith for rendering said relay non-responsive to said interrupter at predetermined intervals.

15. In a calling device, an impulse sender, a plurality of keys for controlling the operation thereof, sets of contacts for each key adapted to be controlled thereby, said impulse sender controlled by the first operation of any key in one call through the medium of one of its associated sets of contacts and by a second operation of said key in the same call through the medium of another of its associated sets of contacts, to transmit impulses corresponding to the digits of a called number.

16. In a telephone system, a calling device for transmitting impulses in accordance with the digits of a called number, including a plurality of operating keys, an arm for each key adapted to control a plurality of sets of contacts, and means whereby when one of said arms is operated to close a set of said contacts, all of said arms are then caused to move to a position before other sets of said contacts, to cause said device to transmit impulses according to the digits of the called number.

17. In a telephone system, a calling device for transmitting impulses in accordance with the digits of the called number; a switch adapted to be operated during the transmission of said impulses, a continuously operating interrupter for controlling the operation of said switch, and means for stopping said switch between the series of impulses representing the various digits of the called number.

18. In a telephone system, a calling device for transmitting impulses in accordance with the digits of the called number; a switch adapted to be operated during the transmission of said impulses, a continuously operating interrupter for controlling the operation of said switch, and means for stopping and releasing said switch to normal position between the series of impulses representing the various digits of the called number.

19. In a telephone system, a calling device for transmitting impulses in accordance with the digits of the called number, a rotary switch adapted to be rotated during the transmission of said impulses, a continuously operating interrupter for controlling the rotation of said switch, a test relay for said switch, for controlling the number of impulses in a series representing the various digits of the called number.

20. In a telephone system, an impulse sender comprising a rotary switch and a single set of digit keys, any one of which may be operated for any digit of the called number, a stepping magnet for said rotary switch controlled by said keys, a line, another switch, a trunk line accessible thereto, a magnet for said other switch for controlling the operation of the same, said line leading from said rotary switch to said other switch, means for operating both of said magnets simultaneously to extend the line to said trunk line.

21. In a telephone system, an impulse sender consisting of a rotary switch having a plurality of wipers and a set of contacts associated with each wiper and accessible thereto, a single set of digit keys for controlling the operation of said sender, any key adapted to be operated for any digit in a called number, means controlled by the operation of the first key for starting the sender and for causing the same to transmit impulses under control of one wiper and its contacts, and controlled by the operation of subsequent keys to transmit impulses of said other digits under control of other wipers and their contacts.

22. In a telephone system, an impulse sender comprising a rotary switch having a plurality of wipers and a set of contacts for each wiper, said switch adapted to rotate and release a plurality of times during the transmission of impulses, each rotation controlled over a different wiper and its contacts, and a set of keys for controlling the switch, each key adapted to successively place a potential on a contact in each set to limit the number of impulses transmitted, and to limit the movement of the switch over the contacts.

23. In an impulse sender, a plurality of contact sets each comprising a series of contacts corresponding to digits, a set of digit keys, and adjustable mechanical actuating means intervening between said keys and contact sets whereby the same set of keys may be used to operate a contact in each of said sets.

24. In an impulse sender, a plurality of contact sets each comprising a series of contacts corresponding to a digit, a set of digit keys, actuating devices intervening between said keys and contact sets and normally adapted for control by said keys to operate the corresponding contacts in the first set, and means for automatically advancing said devices to the next set each time a key is operated.

25. In an impulse sender, a plurality of contact sets each comprising a series of contacts corresponding to a digit, a set of digit keys, actuating devices intervening between said keys and contact sets and normally adapted for control by said keys to actuate the corresponding contacts in the first set, a movable carriage supporting said devices, and means for automatically advancing said carriage every time a key is operated in order to position said devices before the contacts in the next set.

26. In a telephone system, a control circuit for setting a train of automatic switches to connect a calling and a called line, a transmitting device for transmitting a plurality of series of impulses to operate said switches, one series for each digit in the number of the called line, a sending switch controlled by said transmitting device during the transmission of impulses, said switch operating to count the impulses in each series and including means for terminating each series when the required number of impulses has been transmitted, and means for automatically moving said switch to normal position after each series of impulses is finished to prepare for the transmission of the next series.

27. In an operator's sender for controlling automatic switches, a switch control circuit, a step by step switch, a constantly driven interrupter, a relay intermittently energized by said interrupter, contacts on said relay for interrupting said control circuit and other contacts on said relay for sending impulses of current to said switch.

28. In an automatic impulse sender, a sending relay for generating groups of impulses, a stop relay for determining the number of impulses in each group, a progressively movable switch and means, including contacts on said sending relay for operating said switch during the generation of each group of impulses, and a wiper on said switch for controlling said stop relay.

29. In an automatic impulse sender, an interrupter for generating groups of impulses, a constantly driven interrupter, an automatic progressively movable switch operated during the generation of each group of impulses by said last interrupter, and means responsive each time to a predetermined extent of movement of said switch for terminating the group by stopping the generation of impulses.

30. In an automatic impulse sender, an interrupter for generating groups of impulses, a counting device comprising a switch, means for advancing said switch a definite distance per impulse during the generation of each group of impulses, means being provided for restoring said switch to normal after each group of impulses is generated, and means responsive each time to a predetermined movement of said switch to shunt said interrupter for terminating the group of impulses which is being generated.

31. In an automatic impulse sender, an impulse generating device, a counting device, means for operating said devices synchronously to transmit predetermined series of impulses, means for restoring the counting device after each series is finished, and a slow-acting device effective after the restoration of said counting device for introducing a time interval between the successive series.

32. In an automatic impulse sender, a switch control conductor, a contact device for producing series of impulses in said conductor, a counting device individual to said contact device for determining the number of impulses in each of said series, a plurality of storage devices, means for placing said counting device under the control of said storage devices successively, and means for placing a shunt around said contact device while its control is being transferred from one storage device to the other.

33. In an automatic impulse sender, a plurality of storage devices, means for generating series of impulses in accordance with the setting of said storage devices, said means including a counting device initially controlled by the first storage device, and a transfer relay for each of the storage devices except the last for shifting the control of said counting device to the next storage device.

34. In a telephone system, an impulse transmitting device, means for setting said device to cause the same to transmit one or a plurality of impulse series of a called number, a signal for informing an operator that all impulses have been transmitted in accordance with the setting of the device regardless of whether the entire number has been set up or not and regardless of the number of impulses in the series, and means for automatically operating said signal.

35. In a telephone system, an impulse transmitting device, means for setting said device to cause the same to transmit one or a plurality of impulse series of a called number, a signal for informing an operator that all impulses have been transmitted in accordance with the setting of the device regardless of whether the entire number has been set up or not, means for automatically operating said signal, and means whereby the operator may cause further series of impulses of the called number to be transmitted by said device and said signal to become inactive until the last series of impulses of the called number has been transmitted.

36. In a telephone system, an impulse transmitting device, means for setting said device to cause the same to transmit series of impulses of a called number, a signal for notifying an operator when all impulse series of a called number have been transmitted, and means for causing said signal to operate following the transmission of each series of impulses in certain instances.

37. In an impulse storing and sending mechanism, a continuously rotating member, a reciprocating digit designating member, a setting device, means for manually operating the setting device in accordance with a train of different digits, means for operating said reciprocating member by said rotating member, and means including the reciprocating member for transmitting a train of impulse series corresponding with the setting of the setting device.

38. In a register sender, a plurality of devices for storing digits in a called number, impulse transmitting means, a counting device, a stop relay controlling said transmitting means, a circuit for said relay controlled by said counting device and one of said storage devices in set position, and a second circuit for said relay controlled by the next storage device in normal position.

39. In a register sender, a plurality of devices for storing digits in a called number, impulse transmitting means, a counting device, a stop relay controlling said transmitting means, a circuit for said relay controlled by said counting device and one of said storage devices in set position, said relay being energized to render said transmitting means ineffective, means for automatically associating said counting device with the next storage device, a circuit for holding said relay energized, and means responsive to the setting of the said next storage device for opening the said holding circuit.

Signed by me at Chicago, Cook County, Illinois, this 13th day of August, 1918.

JOHN H. HOMRIGHOUS.